Sept. 24, 1929.　　　B. SHADLEY ET AL　　　1,729,552
COMBINATION BROILER AND TOASTER
Filed April 10, 1928　　　3 Sheets-Sheet 1
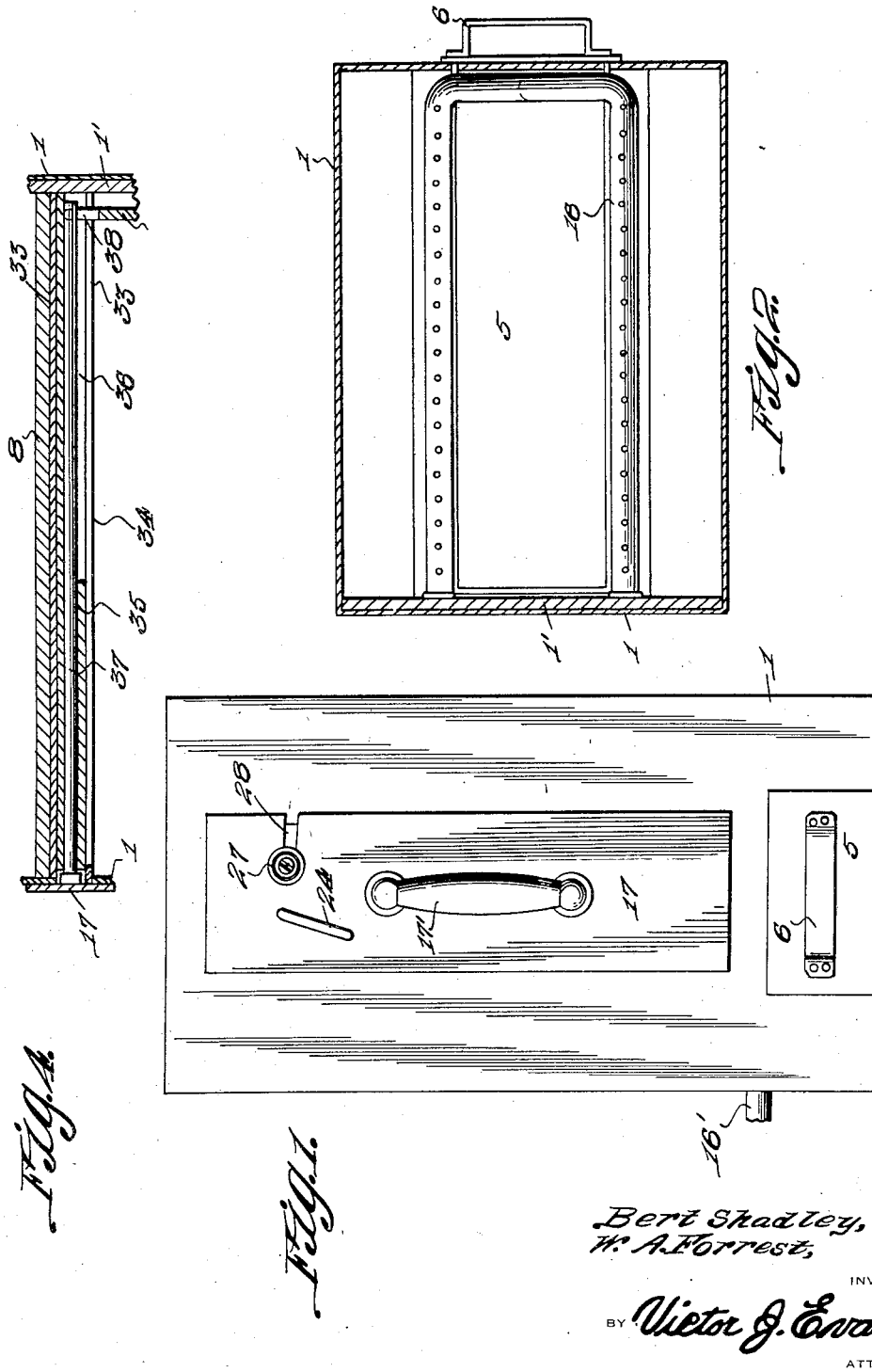

Sept. 24, 1929.  B. SHADLEY ET AL  1,729,552
COMBINATION BROILER AND TOASTER
Filed April 10, 1928   3 Sheets-Sheet 2
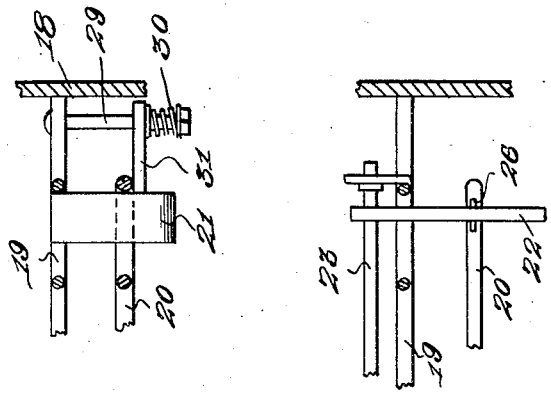
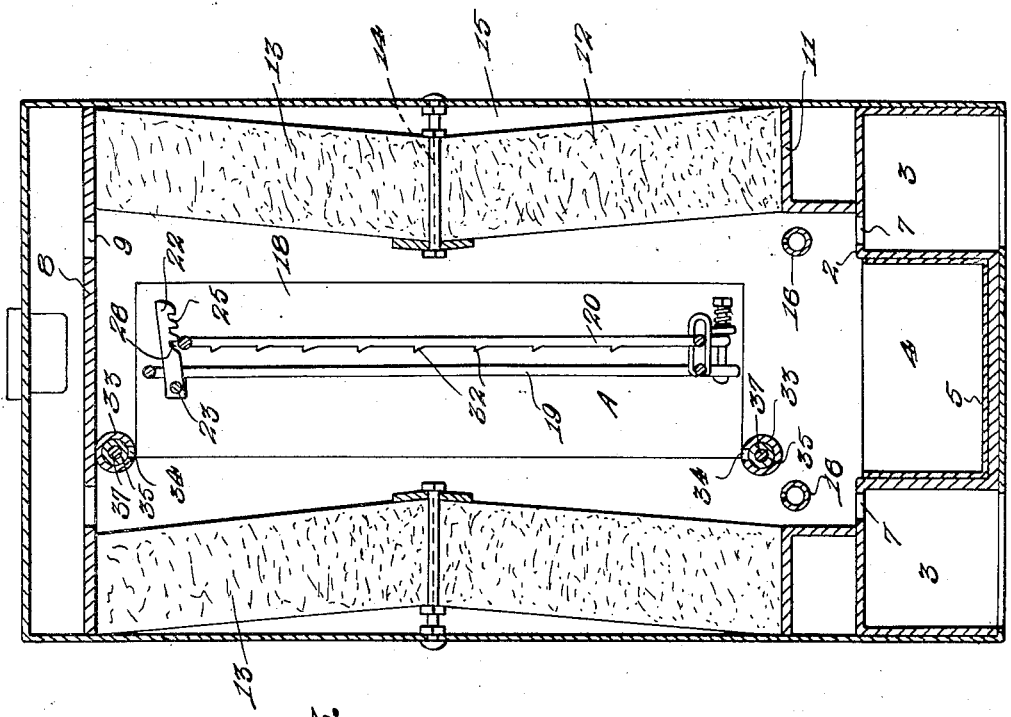
Bert Shadley.
W. A. Forrest,
INVENTOR
BY Victor J. Evans
ATTORNEY

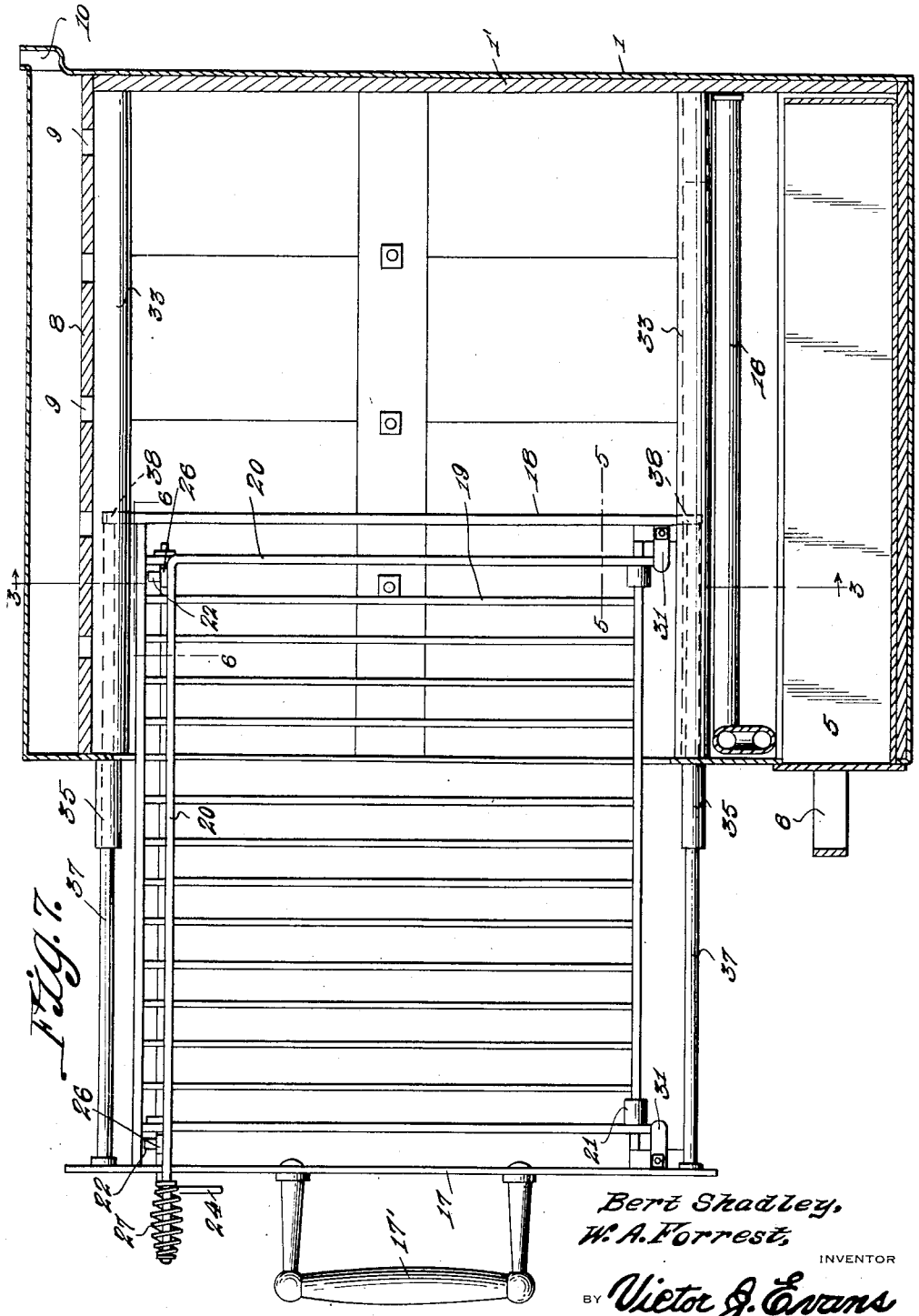

Patented Sept. 24, 1929

1,729,552

UNITED STATES PATENT OFFICE

BERT SHADLEY AND WHITE A. FORREST, OF SANTA MONICA, CALIFORNIA

COMBINATION BROILER AND TOASTER

Application filed April 10, 1928. Serial No. 268,921.

This invention relates to a combination broiler and toaster, the general object of the invention being to provide a chamber having heating means therein with a member removably arranged in the casing and supporting vertically arranged racks for holding the articles to be toasted or broiled between them, with a drip pan under the racks for receiving the drippings from the articles being cooked.

Another object of the invention is to hingedly and movably connect one of the racks with the other rack so that it can be swung downwardly in order to place the articles between the racks, with spring means for pressing the movable rack toward the other rack so that the movable rack will adjust itself to the thickness of the article placed between the racks.

Another object of the invention is to provide means for reflecting the heat against the articles held between the racks so as to provide a uniform heating of the articles and also to provide means for limiting the outward movement of the rack carrying member to enable said member to be drawn from the casing to free the racks of the casing to permit articles to be placed between the racks or removed therefrom while preventing the rack supporting member from being entirely removed from the casing.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a front view of the improved device.

Figure 2 is a horizontal sectional view showing the heating means and the drip pan.

Figure 3 is a section on line 3—3 of Figure 7.

Figure 4 is a detail sectional view through one of the telescopic means for limiting the outward movement of the rack carrying member.

Figure 5 is a section on line 5—5 of Figure 7.

Figure 6 is a section on line 6—6 of Figure 7.

Figure 7 is a vertical sectional view through the device, with the rack carrying member partly withdrawn from the casing.

In these views, the numeral 1 indicates a casing which has its bottom 2 so formed that it provides a pair of air chambers 3 at the sides of the casing and a central chamber 4 for receiving a drip pan 5 which extends through a hole in the front of the casing, with a handle 6 on its front end. The chambers 3 are open at the bottom so that air can pass into the same and the upper walls of the chambers are provided with the holes 7 so that air can pass from the chambers into the casing. A partition 8 is arranged in the casing adjacent the top thereof and this casing is provided with the holes 9 so that the products of combustion and gaseous matter from the articles being cooked can pass from the casing into the space between the partition 8 and the top of the casing and through the discharge opening 10 at the rear of the casing.

A member 11 of angle shape in cross section rests on each air chamber 3 and against a part of the casing and is suitably connected with the casing and these members form supports for the lower fire bricks 12. These bricks extend upwardly and inwardly at an angle and abut the lower ends of the upper bricks 13 which extend downwardly and inwardly from the partition 8. The bricks are supported at their abutting ends by the means shown generally at 14. This arrangement of bricks at each side of the casing forms an air space 15 between the sides of the casing and the bricks and these bricks tend to direct the heat from the burners 16 toward the center of the casing.

A rack carrying member A is centrally arranged in the casing and extends through an opening in the front of the casing, said member comprising a front plate 17 which acts as a door for closing the opening in the front of the casing, a rear plate 18, the stationary rack 19 which is vertically arranged and which has its ends connected with the front and rear plates and the movable rack 20 which is hingedly and movably connected at its lower end with the lower end of the stationary rack by the hinge forming loops 21 fastened to the lower end of the stationary rack and through which the lower part of the movable rack passes.

A pair of latch bars 22 is fastened to a shaft 23 which passes through the front plate and has its outer end bent to form a handle 24 so that the rack bar can be raised and lowered from the outside of the casing. Each bar is provided with a plurality of holes 25, any one of which is adapted to engage a projection 26 on the upper end of the movable rack. A handle 27 is attached to the front of the top bar of the movable rack and extends through a notch 28 formed in the front plate so that the movable rack can be raised and lowered through means of this handle.

Bolts 29 are carried by the lower end of the stationary rack and springs 30 are arranged on said bolts and press against arms 31 attached to the movable rack for pressing the lower edge of the movable rack toward the stationary rack. The inner face of the movable rack is provided with the teeth 32 for engaging the articles placed between the racks to prevent the articles from slipping.

A pair of tubes 33 is arranged in the casing, adjacent one side edge of the opening for the member A, each tube being slotted, as shown at 34, and a second tube 35 is slidably arranged in each of the tubes 34, this tube being slotted, as at 36, over a portion of its length. A rod 37 is slidably arranged in each tube 35 and the front end of each rod 37 is connected with the inner face of the outer plate 17 and the inner plate 18 is formed with projections 38 which are connected with the inner ends of the rods. Thus the member A is supported by the telescopic members when the said member is pulled outwardly from the casing and as the member is being pulled outwardly, the projections on the rear plate, striking the front ends of the slots 36 and the tubes 35, will cause the tubes to move outwardly with the member A until the rear plate is moved to a position flush with the front of the casing, when further movement of the parts will be prevented. As the movable rack is shorter than the stationary rack, in this position of the member A, the movable rack can be swung downwardly through means of its handle 27 so that articles can be placed thereon or removed therefrom. After the articles have been placed on this rack, the rack is swung upwardly until it engages one of the notches in the latch bar 22, when said latch bar will hold the movable rack in raised position. Then the member A is shoved back into the casing so that the articles will be broiled or toasted.

Any drippings from the articles being cooked will drop in the pan and as this pan is removable, the drippings can be easily removed therefrom and the front plate 17 is provided with a handle 17' so that the member A can be moved into and out of the casing. The burner pipes 16 are placed one at each side of the heating chamber formed by the fire bricks adjacent the lower sides thereof and the front ends of these tubes are connected to a supply of gas or the like by the pipe 16'. Parts of the casing not covered by the fire bricks may be provided with a suitable lining, such as shown at 1'.

From the foregoing it will be seen that we have provided simple means for broiling steaks or other articles of food and for toasting bread and the like, the articles being easily placed between the racks and removed therefrom, with the rack carrying member so attached to the casing that it can be fully drawn therefrom without entirely detaching it from the casing and with a drip pan for catching the drippings from the articles being cooked so that gravy can be made from such drippings.

It is thought from the foregoing description that the advantages and novel features of our invention will be readily apparent.

It is to be understood that we may make changes in the construction and in the combination and arrangement of the several parts, provided that such changes fall within the scope of the appended claim.

What we claim is:—

A device of the class described comprising a casing having an opening in its front, a plate covering the opening, bars having their outer ends connected with the inner faces of the plate, slotted tubes in the casing slidingly receiving the bars, a vertically arranged rack having its front end connected with the front of the plate, projections on the rear end of the rack passing through the slots in the tubes and connected with the bars, a second rack, hinge forming loops at the bottom of the first rack and engaging portions of the second rack, spring means for forcing the lower part of the second rack toward the lower part of the first rack, latch means connected with the first rack and engaging parts of the second rack for holding said second rack in vertical position, a handle connected with the latch means and passing through the plate and means within the casing for heating the same.

In testimony whereof we affix our signatures.

BERT SHADLEY.
WHITE A. FORREST.